(12) United States Patent
Fujiyama et al.

(10) Patent No.: US 7,883,258 B2
(45) Date of Patent: Feb. 8, 2011

(54) PLANAR ILLUMINATING DEVICE AND DISPLAY APPARATUS

(75) Inventors: Yutaka Fujiyama, Niigata (JP); Hiroaki Kimura, Niigata (JP)

(73) Assignee: Sharp Kabushiki Kaisha, Osaka (JP)

( * ) Notice: Subject to any disclaimer, the term of this patent is extended or adjusted under 35 U.S.C. 154(b) by 179 days.

(21) Appl. No.: 12/368,128

(22) Filed: Feb. 9, 2009

(65) Prior Publication Data

US 2009/0207629 A1    Aug. 20, 2009

(30) Foreign Application Priority Data

Feb. 15, 2008   (JP) .............................. 2008-035349

(51) Int. Cl.
    *F21V 7/04* (2006.01)
(52) U.S. Cl. ................ 362/628; 362/613; 362/616; 362/625
(58) Field of Classification Search ......... 362/330, 362/331, 332, 601, 602, 612, 613, 615, 616, 362/623, 624, 625, 628
    See application file for complete search history.

(56) References Cited

U.S. PATENT DOCUMENTS

| | | |
|---|---|---|
| 6,241,358 B1 | 6/2001 | Higuchi et al. |
| 7,798,698 B2 * | 9/2010 | Segawa ................ 362/616 |
| 2001/0017774 A1 | 8/2001 | Ito et al. |
| 2002/0024803 A1 | 2/2002 | Adachi et al. |
| 2003/0202363 A1 | 10/2003 | Adachi et al. |
| 2004/0174717 A1 | 9/2004 | Adachi et al. |
| 2005/0007753 A1 * | 1/2005 | Van Hees et al. ........ 362/613 |
| 2005/0180124 A1 | 8/2005 | Adachi et al. |
| 2005/0180167 A1 * | 8/2005 | Hoelen et al. .......... 362/615 |
| 2007/0008739 A1 * | 1/2007 | Kim et al. ............. 362/612 |
| 2007/0091641 A1 | 4/2007 | Lin et al. |
| 2007/0247833 A1 | 10/2007 | Lee et al. |

FOREIGN PATENT DOCUMENTS

| | | |
|---|---|---|
| JP | 2001-42327 | 2/2001 |
| JP | 2008-166294 | 7/2008 |

* cited by examiner

*Primary Examiner*—Y My Quach Lee
(74) *Attorney, Agent, or Firm*—Morrison & Foerster LLP

(57) ABSTRACT

In order to realize a thin and simple-structured planar illuminating device which is capable of carrying out the regional light control, a backlight module 1 of the present invention includes a light guiding plate 2 including steps 21a, 21b, and 21c, a plurality of LEDs 3 provided in the vicinity of one side surface of the light guiding plate 2, and light guides 4a, 4b, and 4c which are provided respectively between each of the steps 21a, 21b, 21c and each of the LEDs 3 facing each other. The regional light control is possible by controlling brightness of each of the LEDs 3. Each of the regions is formed so as to correspond to each of the bottom surfaces 22a, 22b, 22c, and 22d.

12 Claims, 22 Drawing Sheets

FIG. 20 (a) PRIOR ART
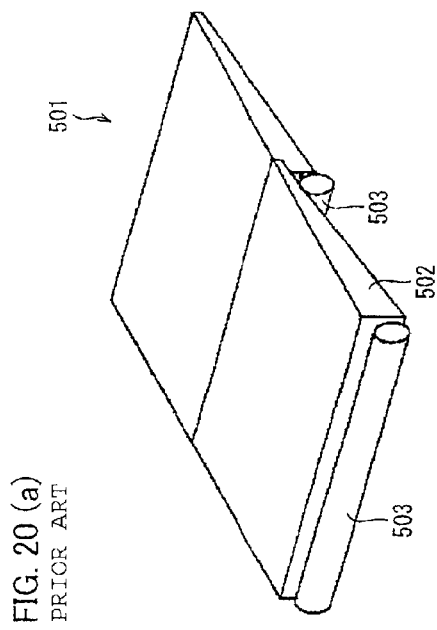
FIG. 20 (b) PRIOR ART
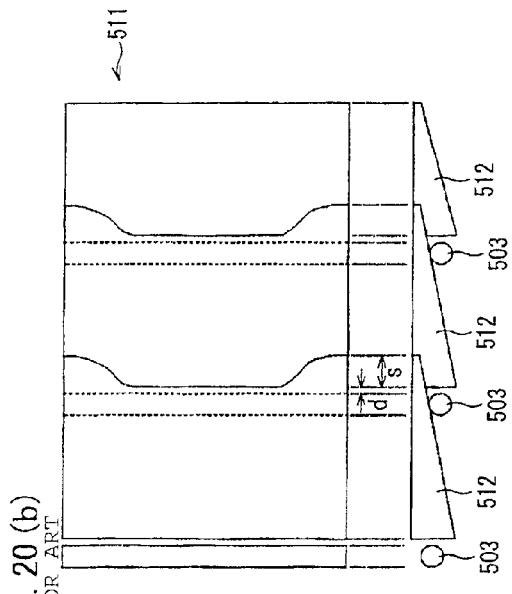
FIG. 20 (c) PRIOR ART
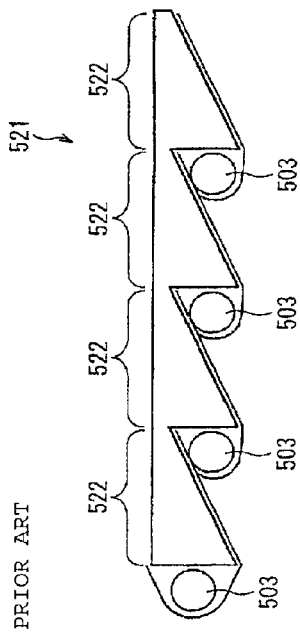
FIG. 20 (d) PRIOR ART
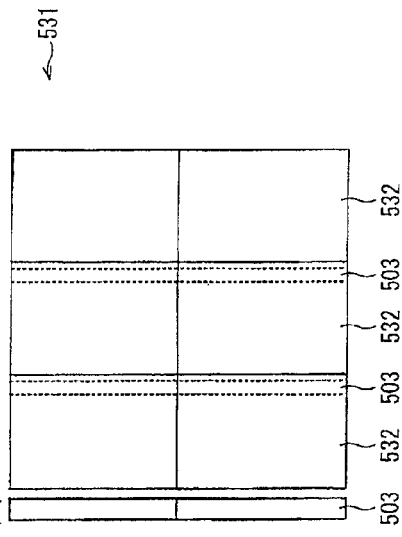

FIG. 22 (a) PRIOR ART
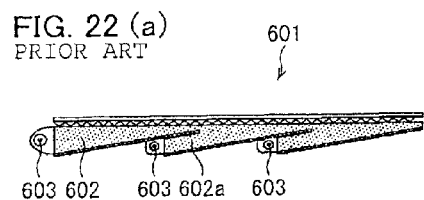
FIG. 22 (b) PRIOR ART
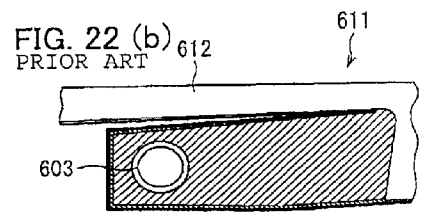
FIG. 22 (c) PRIOR ART
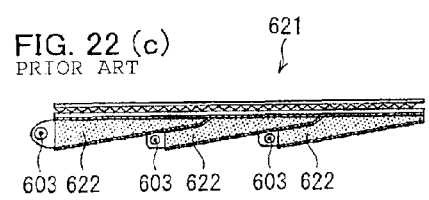
FIG. 22 (d) PRIOR ART
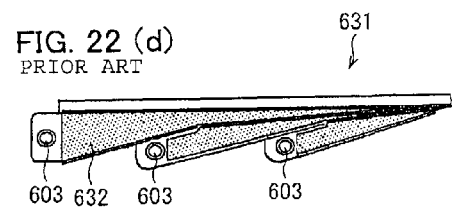
FIG. 22 (e) PRIOR ART
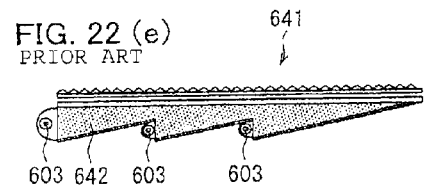
FIG. 22 (f) PRIOR ART
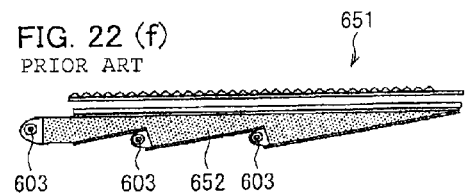
FIG. 22 (g) PRIOR ART
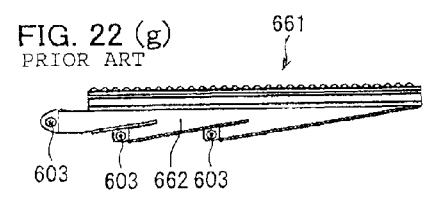
FIG. 22 (h) PRIOR ART
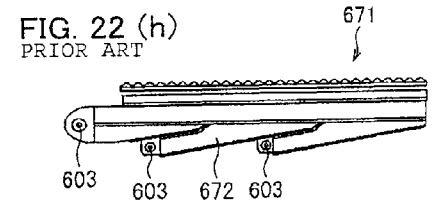
FIG. 22 (i) PRIOR ART
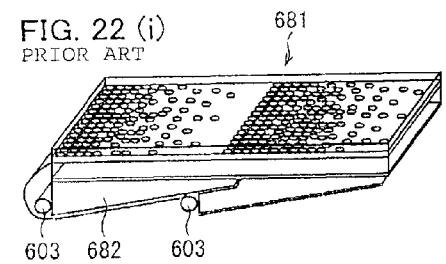

PLANAR ILLUMINATING DEVICE AND DISPLAY APPARATUS

This Nonprovisional application claims priority under U.S.C. §119(a) on Patent Application No. 035349-2008 filed in Japan on Feb. 15, 2008, the entire contents of which are hereby incorporated by reference.

FIELD OF THE INVENTION

The present invention relates to a planar illuminating device, used as a backlight of an apparatus such as a liquid crystal display apparatus, which is capable of a regional light control (such as a local dimming control, and an area active control).

BACKGROUND OF THE INVENTION

Traditionally, backlights used as light source devices for apparatuses such as liquid crystal display apparatuses are roughly classified into a direct backlight and an edge light type backlight.

In the direct backlight, a light source is provided directly below a liquid crystal panel. FIG. 18 is a cross-sectional view illustrating a typical direct backlight 301. In the backlight 301, LEDs (light-emitting-diode) 304 serving as a light source are provided on an LED substrate 303 which is provided below a diffuser 302. Light emitted from each of the LEDs 304 is diffused outward by the diffuser 302. Each of the LEDs 304 is not a linear light source such as a cold cathode fluorescent lamp, but a point light source. This allows provision of a so-called regional light control (such as a local dimming control, or an area active control), which controls brightness of backlight regions in sync with brightness of display image areas, respectively, in a liquid crystal display apparatus. As a result, it is possible to significantly improve contrast of a liquid crystal display apparatus and to lower the power consumption. The local dimming control is explained in detail in paragraph [0004] of Japanese Unexamined Patent Application Publication, Tokukai, No. 2007-286627 (date of publication: Nov. 1, 2007). Note that the area active control is another expression of the local dimming control. The area active control and the local dimming control are technically identical to each other. However, it is difficult to make the backlight 301 thinner because a distance T between the LED substrate 303 and the diffuser 302 should be long enough to prevent uneven light emissions of a light source section.

Recently, thicknesses of display apparatuses such as liquid crystal televisions and liquid crystal monitor displays have been reduced. Therefore, a light source for a large-screen display apparatus is in the process of being switched over from a direct backlight to an edge light type backlight.

The edge light type backlight has an arrangement in which (i) a light source is arranged in the vicinity of a frame of a display apparatus, and (ii) the light source emits light into a translucent resin (light guiding plate) which is made of material such as an acrylic resin so as to provide an even light emission within a surface. FIG. 19 is a cross-sectional view illustrating a representative edge light type backlight 401 with use of an LED light source. In the backlight 401, an LED 404 is provided on an LED substrate 403 which is provided on a side of a light guiding plate 402. This allows the light guiding plate 402 to guide upward light emitted from the LED 404. Since the light from the LED 404 is guided upward without increasing a thickness T2 of the light guiding plate 402, a thickness of a liquid crystal display apparatus can be reduced with ease. However, the light guiding plate 402 only allows an entire display screen to emit but allows a regional light control such as the local dimming control to be carried out.

In view of the circumstances, various kinds of backlight arrangements are proposed so as to achieve a thin liquid crystal display apparatus and the regional light control. (refer to Japanese Unexamined Patent Publication, Tokukaihei, 11-288611 (date of publication: Oct. 19, 1999), Japanese Unexamined Patent Publication, Tokukai, 2001-312916 (date of publication: Nov. 9, 2001), Japanese Unexamined Patent Publication, Tokukai, 2001-42327 (date of publication: Feb. 16, 2001), and Japanese Unexamined Patent Publication, Tokukai, 2002-75036 (date of publication: Mar. 15, 2002), for example)

FIG. 20(a) through FIG. 20(d) respectively illustrates tandem type surface light source devices 501, 511, 521, and 531 disclosed in Japanese Unexamined Patent Publication, Tokukaihei, 11-288611. The surface light source device 501 has a plurality of light guiding plates 502; the surface light source device 511 has a plurality of light guiding plates 512; the surface light source device 531 has a plurality of light guiding plates 532; and the surface light source device 521 has an integral light guiding plate 522. Each of the light guiding plates is getting thinner as getting far from a light source. In the surface light source devices 501, 511, 521, and 531, a light source 503 is provided at each step where two adjacent light guiding plates overlap each other. It is possible to carry out light control of each of the light guiding plates 502, 512, 522 and 532, by controlling brightness of each of the light sources. This allows a liquid crystal display apparatus to become thinner and larger.

However, with an arrangement disclosed in Japanese Unexamined Patent Publication, Tokukaihei, 11-288611, a blight line emerges in the vicinity of a light source, as illustrated in FIG. 21. According to Japanese Unexamined Patent Publication, Tokukai, 2001-312916, a light guiding plate is arranged so that a section, on which the light from a light source provided at each step is incident, is extended. This allows the bright line not to emerge.

The FIG. 22(a) through FIG. 22(i) illustrate surface light source devices 601, 611, 621, 631, 641, 651, 661, 671, and 681 each of which is disclosed in Japanese Unexamined Patent Publication, Tokukai, 2001-312916. The surface light source device 601 has a plurality of light guiding plates 602; the surface light source device 611 has a plurality of light guiding plates 612; the surface light source device 621 has a plurality of light guiding plates 622; the surface light source device 631 has a plurality of light guiding plates 632; the surface light source device 641 has a plurality of light guiding plates 642; the surface light source device 651 has a plurality of light guiding plates 652; the surface light source device 661 has a plurality of light guiding plates 662; the surface light source device 671 has a plurality of light guiding plates 672; and the surface light source device 681 has a plurality of light guiding plates 682. Each of the light guiding plates is getting thinner as getting far from a light source 603, and the light source 603 is provided at each step of the light guiding plate (s). For example, as illustrated in FIG. 22(a), the light guiding plate 602 has an extended section 602a which follows a light source 603 provided at a step of the light guiding plate 602. Similarly, each of the light guiding plates 612, 622, 632, 642, 652, 662, 672, and 682 has an extended section. This allows realization of a thin and large-sized liquid crystal display apparatus which is capable of carrying out a regional light control. Moreover, it is possible to prevent a bright line which occurs in the vicinity of a light source in tandem type surface light source devices illustrated in FIG. 20(a) through FIG. 20(d).

FIG. 23(a) and FIG. 23(b) illustrate a backlight 701 disclosed in Japanese Unexamined Patent Publication, Tokukai, 2001-42327. The backlight 701 has a plurality of light guiding plates 702, and a light source 703 is provided between adjacent two light guiding plates 702. The light guiding plate 702 has, in a longitudinal direction, a protruding edge part 704 on its each side on which the light emitted from the light source is incident. This allows realizing a thin and large-sized liquid crystal display apparatus which is capable of carrying out the regional light control.

Further, in order to improve uniformity of brightness within a surface, Japanese Unexamined Patent Publication, Tokukai, 2002-75036 discloses an arrangement in which a light guiding plate has a sloped surface and optimizes an angle of the sloped surface.

FIG. 24(a) and FIG. 24(b) illustrate an illuminating device 801 disclosed in Japanese Unexamined Patent Publication, Tokukai, 2002-75036. FIG. 24(c) illustrates an illuminating device 811 disclosed in Japanese Unexamined Patent Publication, Tokukai, 2002-75036. The illuminating device 801 includes a plurality of light guiding plates 802, and light sources 803 between respective adjacent two light guiding plates 802. This allows the regional light control to be carried out, as illustrated in FIG. 24(b). Further, the light guiding plate 802 has a sloped surface so that brightness within a surface is uniformed by optimizing an angle of the sloped surface. Further, instead of using the light guiding plate 802 of the illuminating device 801, the illuminating device 811 is arranged so that two light guiding plates 812a and 812b are stacked, each of which has a wedge-shaped cross-section. With the arrangement, it is possible to uniform brightness within a surface by optimizing a cross-sectional shape of each of the light guiding plates 812a and 812b.

Further, Japanese Unexamined Patent Publication, Tokukai, 2007-115695 (publication date: May 10, 2007) discloses arrangements in which edge-light type backlight modules are joined at each step provided between adjacent two light guiding plates. FIG. 25(a) and FIG. 25(b) are cross sectional views illustrating a backlight 901 and a backlight 911, respectively, both of which are disclosed in Japanese Unexamined Patent Publication, Tokukai, 2007-115695. The backlight 901 includes a plurality of light guiding plates 902 and a plurality of light emitting sections 904 each including a light source 903. The backlight 911 includes a plurality of light guiding plates 912 and a plurality of light emitting sections 914 each including a light source 903. The light guiding plates 902 and 912 are connected to the light emitting sections 904 and 914 so as to create a step arrangements, respectively. This allows provision of a large-sized backlight and allows the regional light control to be carried out by adjusting brightness of each of the light sources 903.

Recently, from an environmental viewpoint, a cold cathode fluorescent lamp, that is currently widely used as a light source for a backlight, has been replaced with an LED. However, the conventional arrangement cause a problem that gives rise to complex arrangement in a case where an LED is used as a light source.

Specifically, in a case where an LED is used as a light source in each of the structures disclosed in Japanese Unexamined Patent Publication, Tokukaihei, 11-288611, Japanese Unexamined Patent Publication, Tokukai, 2001-312916, Japanese Unexamined Patent Publication, Tokukai, 2001-42327, and Japanese Unexamined Patent Publication, Tokukai, 2002-75036, a substrate including LEDs (light source section) should be provided in different places, thereby increasing a cost of parts. Further, the number of connections between the substrates increases, so that the structure becomes complicated. This causes a problem that gives rise to high difficulty of assembly work of a backlight.

Moreover, in a case where a plurality of light guiding plates are provided (for example, FIG. 20(a), FIG. 22(c), and FIG. 23 through FIG. 25), additional arrangements are required to support the light guiding plates, respectively. This causes more complex arrangement.

SUMMARY OF THE INVENTION

The present invention was made in view of the foregoing problems. An object of the present invention is to realize a thin and simple-structured planar illuminating device which is capable of carrying out a regional light control and a display apparatus including the planar illuminating device.

To attain the object, the planar illuminating device of the present invention includes a light guiding plate which is a transparent flat plate, and a plurality of light sources provided at one side surface of the light guiding plate, the light guiding plate outputting, from its upper surface, light coming from the plurality of light sources, the plurality of light sources being provided in a direction perpendicular to the upper surface of the light guiding plate, the light guiding plate having a bottom surface which includes at least one step, the planar illuminating device, further including: a light guide provided between each step and corresponding one of the plurality of light sources which faces the step, the light guide being thinner than that step.

According to the arrangement, the plurality of the light sources are provided at the side surface of the light guiding plate in the direction perpendicular to the upper surface of the light guiding plate, and the light guiding plate outputs, from its upper surface, light coming from the light sources. In this specification, the light guiding plate has the bottom surface which includes at least one step. Between the step and a corresponding one of the light sources which faces that step, a light guide is provided which transmits light from the light source to the step.

Accordingly, light emitted from a light source which faces a step enters the step after traveling inside a light guide. The light entered the step is reflected and/or scattered at a bottom surface provided between the step and a next step (or between the step and the other side surface of the light guiding plate where no LED is provided), and then the light is outputted from the upper surface of the light guiding plate. Light from a light source which faces the side surface of the light guiding plate enters that side surface. The light entered the side surface of the light guiding plate is reflected and/or scattered at a bottom surface between that side surface and a step which is the closest to that side surface, and then the light is outputted from the upper surface of the light guiding plate.

As described above, beams of light entered the side surface of the light guiding plate and the steps are reflected and/or scattered at respective bottom surfaces of the light guiding plate, and then the beams of light are outputted from respective upper surfaces of the light guiding plate. This makes the regional light control possible by adjusting a current flowing each of the light sources so as to control brightness of each of the beams of light entering the side surfaces of the light guiding plate and the steps. Each of the regions is formed by dividing the light guiding plate with the plurality of steps.

Further, the present invention is an edge light type backlight which includes light sources in the vicinity of a side surface of a light guiding plate. Compared to a direct backlight, the edge light type backlight can be thinly formed. Further, the light sources are provided in the vicinity of one side surface of the light guiding plate so that only one substrate is required in a case where LEDs are used as a light source. This makes simplify wiring and a supporting structure of the substrate. As a result, it is possible to realize a thin and simple-structured planar illuminating device which is capable of carrying out the regional light control.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 20(a) through FIG. 20(d) are drawings illustrating a conventional tandem type surface light source devices.

FIG. 22(a) through FIG. 22(i) are drawings illustrating another conventional surface light source devices.

DESCRIPTION OF THE EMBODIMENTS

First Embodiment

The following description deals with an embodiment in accordance with the present invention with reference to FIG. 1 through FIG. 17.

Figure 1:
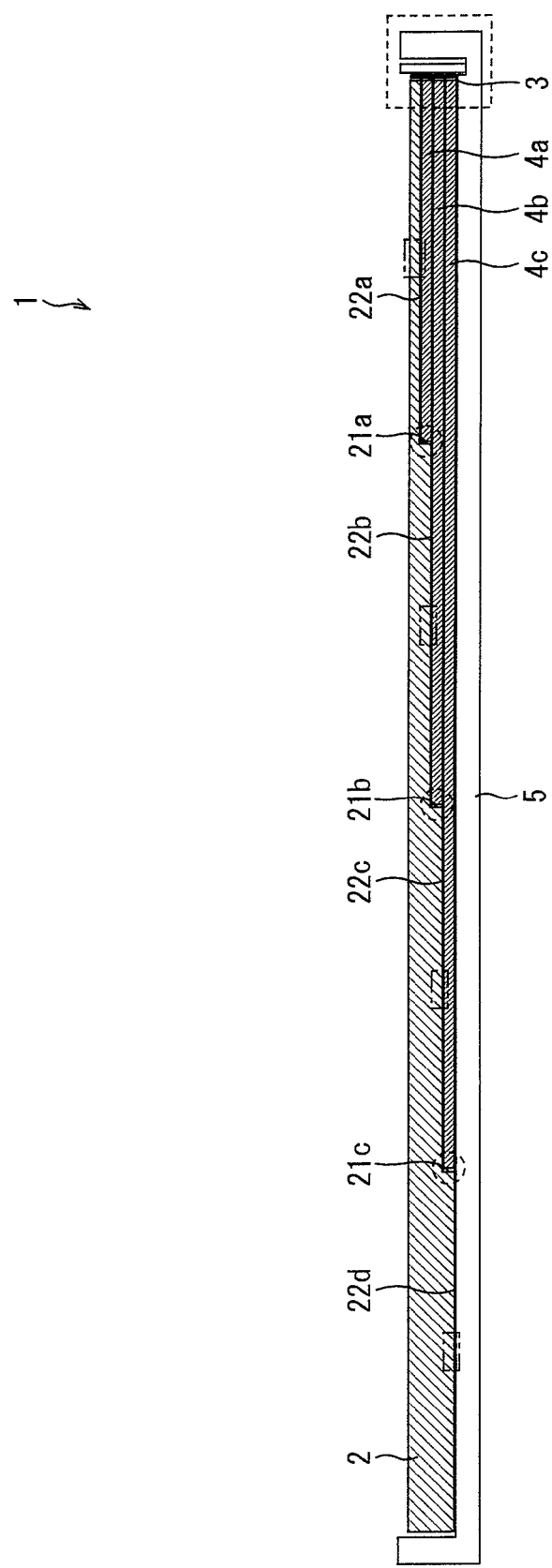
FIG. 1 is a cross-sectional view illustrating a backlight module illustrated in FIG. 2, viewed along the line A-A.
Figure 2:
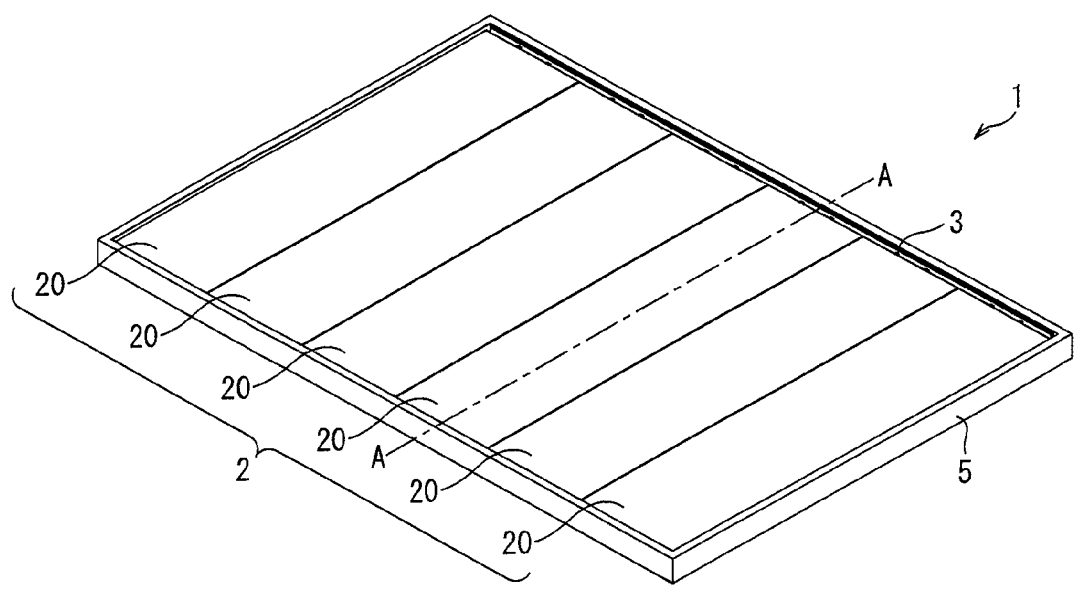
FIG. 2 is a perspective view illustrating a backlight module in accordance with an embodiment of the present invention.
Figure 3:
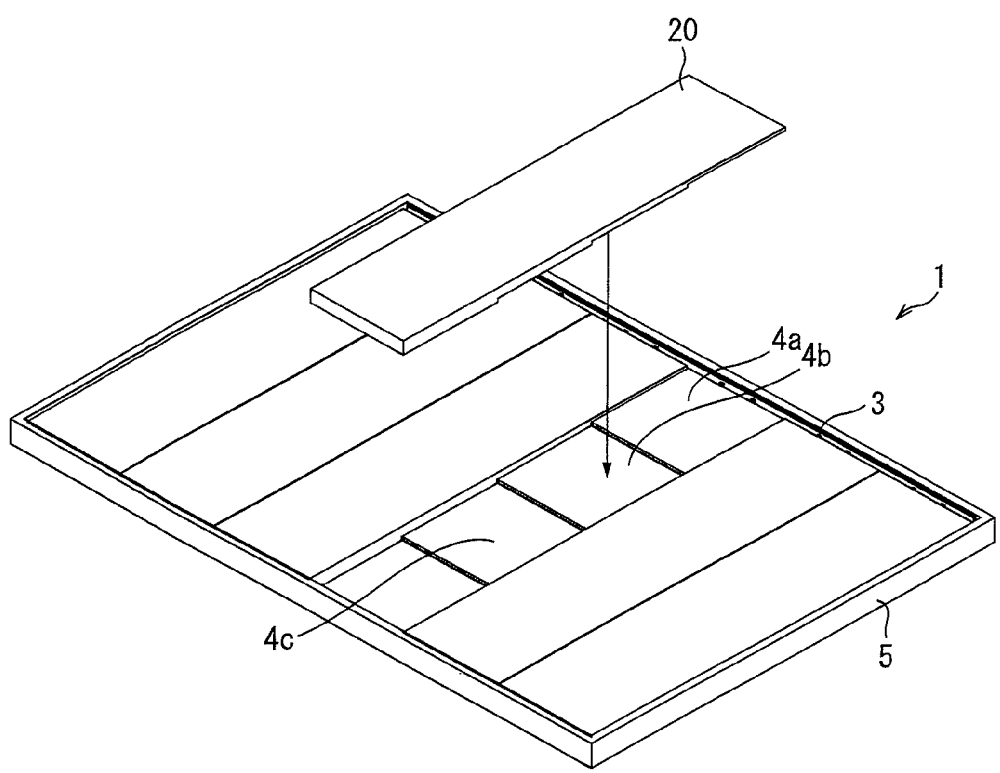
FIG. 3 is a perspective view illustrating the backlight module illustrated in FIG. 2 before attaching one light guiding block which is made by dividing a light guiding plate.

FIG. 2 is a perspective view illustrating a backlight module 1 in accordance with the present embodiment. FIG. 3 is a perspective view illustrating a situation obtained before one of light guiding blocks 20 into which a light guiding block 2 is divided is attached to the backlight module 1 illustrated in FIG. 2. Further, FIG. 1 is a cross-sectional view of the backlight module 1 illustrated in FIG. 2, viewed along the line A-A. The backlight module 1 is used as a light source of a liquid crystal display device. The backlight module 1 includes the light guiding plate 2, a plurality of LEDs 3, and three light guides 4a, 4b, and 4c. The light guiding plate 2, the plurality of LEDs 3, and the three light guides 4a, 4b, and 4c are held and housed inside the housing 5.

The light guiding plate 2 is made of a visible light transmissive material such as an acrylic resin, or a polycarbonate resin. The light guiding plate 2 is divided into 6 light guiding blocks 20 each of which has the same width. The light guiding plate 2 is a thin transparent plate which has an upper surface, a bottom surface, and side surfaces. The upper surface and the bottom surface are large surfaces facing each other in a thickness direction of the light guiding plate 2. Further, the side surfaces of the light guiding plate 2 face each other in a direction perpendicular to the thickness direction of the light guiding plate 2.

In the vicinity of one side surface of the light guiding plate 2, a plurality of LEDs 3 are provided. Light emitted from the LEDs 3 enters the side surface of the light guiding plate 2, and is then guided outward from the upper surface of the light guiding plate 2, via a diffusion sheet (not illustrated) and a prism sheet (not illustrated).

In this specification, "in the vicinity of the light guiding plate" means that it is not necessary to seal, with sealer such as a resin, a gap between the light guiding plate and the light source. The light source can contact the light guiding plate, provided that it is merely in physical contact with the light guiding plate. The narrower the gap between the light source and the light guiding plate or between the light source and the light guides is, the lesser the amount of leaking light which is emitted from the LED and fails to enter the light guiding plate or the light guides. Note from a practical standpoint that it is needless to say that a gap can exist, provided that the gap causes no problem.

Note that the upper surface of the light guiding plate 2 is flat, whereas the bottom surface of the light guiding plate 2 has three steps 21a, 21b, and 21c. This makes the light guiding plate 2 thinner stepwisely from the other side surface where no LED 3 is provided, toward the side surface where the LEDs are provided. The number of steps is not specifically limited to three and can be altered depending on a size of each region controlled by a local dimming control.

This causes the upper surface and the bottom surface of the light guiding plate 2 to be parallel to each other. As such, it is easy to layout and easy to process even in a case where the light guiding plate 2 is formed by a cutting work performed by a machine. Moreover, unlike the light guiding plate which has a wedge-shaped cross-section, it is not necessary to consider an angle of the wedge.

Further, the light guides 4a, 4b, and 4c are provided between the step 21a and the LED 3, between the step 21b and the LED 3, and between the step 21c and the LED 3, respectively. The light guides 4a, 4b, and 4c, made of visible light transmissive materials such as an acrylic resin or a polycarbonate resin, are provided so as to have a plate shape. The light guides 4a, 4b, and 4c have thicknesses of not more than the steps 21a, 21b, and 21c, respectively. The light guides 4a, 4b, and 4c receive light beams at one ends where the LEDs 3 are provided, and guide them toward the other ends, respectively. Then, the light beams thus guided enter the steps 21a, 21b, and 21c, respectively.

Figure 4:
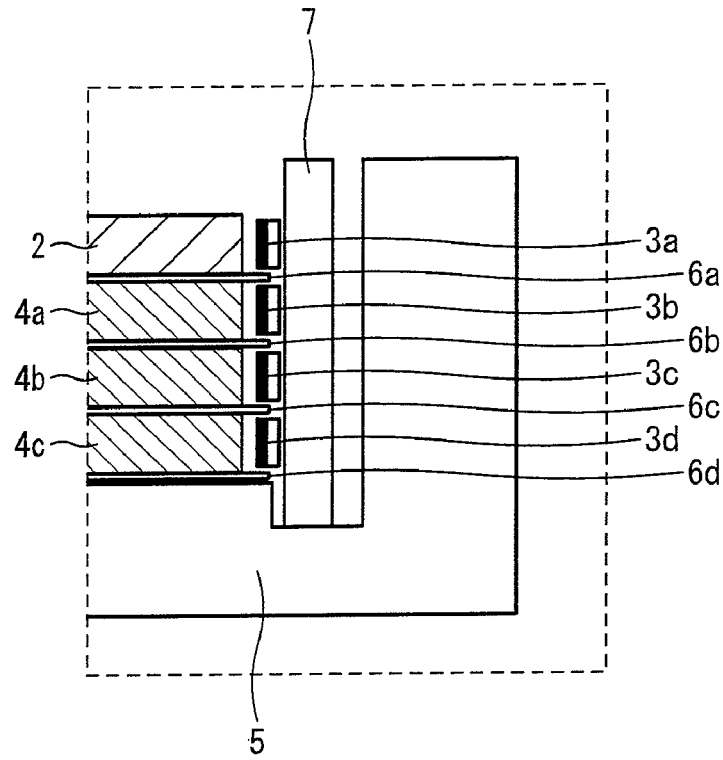
FIG. 4 is a partial magnified view illustrating a rectangular area outlined by a dashed line in the backlight module illustrated in FIG. 1

FIG. 4 is a partial magnified view illustrating a rectangular area outlined by a dashed line in the backlight module 1 illustrated in FIG. 1. As illustrated in FIG. 4, the LEDs 3 are provided on an LED substrate 7 which is provided so as to be perpendicular to the upper surface of the light guiding plate 2. For the sake of convenience, it is assumed that an LED 3a is the one facing the end of the light guiding plate 2, an LED 3b is the one facing the end of the light guide 4a, an LED 3c is the one facing the end of the light guide 4b, and an LED 3d is the one facing the end of the light guide 4c.

Further, reflecting sheets 6a, 6b, 6c, and 6d are provided between the light guiding plate 2 and the light guide 4a, between the light guide 4a and the light guide 4b, between the light guide 4b and the light guide 4c, and between the light guide 4c and the housing 5, respectively. The reflecting sheets 6a, 6b, 6c, and 6d reflect light from boundaries (i) between the light guiding plate 2 and the light guide 4a, (ii) between the light guide 4a and the light guide 4b, (iii) between the light guide 4b and the light guide 4c, and (iv) between the light guide 4c and the housing 5, respectively.

As such, beams of light which entered one ends of the light guides, enter the steps, as they are, from the other ends of the light guides, respectively. This makes it easier for the regional light control to be carried out, thereby resulting in achieving high contrast.

Figure 5:
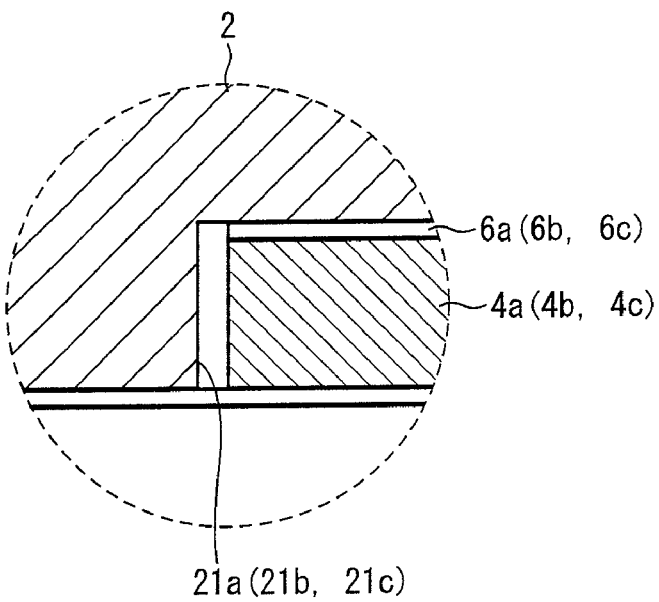
FIG. 5 is a partial magnified view illustrating a circled area outlined by a dashed line in the backlight module illustrated in FIG. 1.
Figure 6:
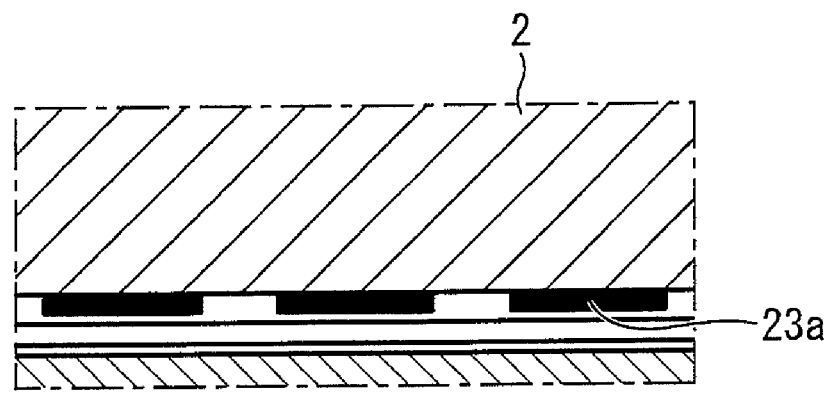
FIG. 6(a) and FIG. 6(b) is a partial magnified view illustrating a rectangular area outlined by a dashed-dotted line in the backlight module illustrated in FIG. 1.
Figure 6:
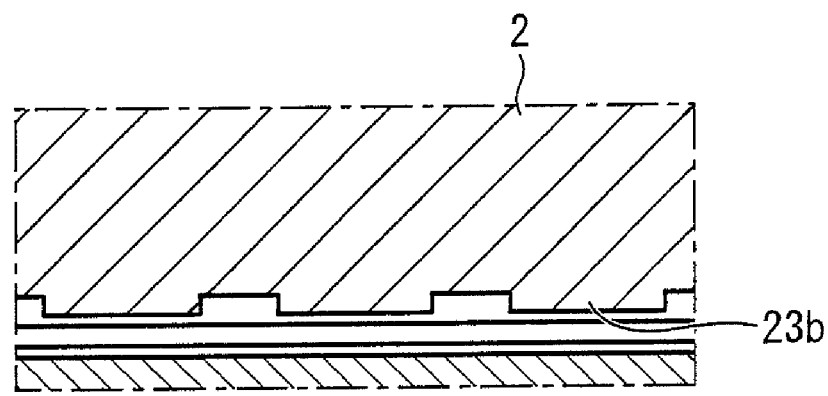

FIG. 5 is a partial magnified view illustrating a circled area outlined by a dashed line in the backlight module 1 illustrated in FIG. 1. The other ends of the light guides 4a, 4b, and 4c, where no LED is provided, are close to and face the steps 21a, 21b, and 21c, respectively.

FIG. 6(a) and FIG. 6(b) are partial magnified views illustrating a rectangular area outlined by a dashed-dotted line in the backlight module 1 illustrated in FIG. 1. As illustrated in FIG. 6(a), bottom surfaces 22a through 22d of the light conducting plate 2, which bottom surfaces do not include the steps of the light conducting plate 2, are subjected to a light reflective process by printing white colored pigment such as a titanic oxide 23a. Note that the bottom surface 22a is a region between the step 21a and the side surface of the light guiding plate 2, where the LEDs 3 are provided; the bottom surface 22b is a region between the step 21a and the step 21b; the bottom surface 22c is a region between the step 21b and the step 21c; and the bottom surface 22d is a region between the step 21c and the other side surface of the light guiding plate 2 where no LED 3 is provided.

Note that, instead of printing white colored pigment such as a titanic oxide 23a, the bottom surfaces 22a through 22d can be integrally formed by a translucent resin 23b, as illustrated in FIG. 6(b). A light reflective process is not limited to specific types and methods.

The following description concretely deals with how the light emitted from the LED 3 travels with referring to FIG. 7 through FIG. 10.

Figure 7:
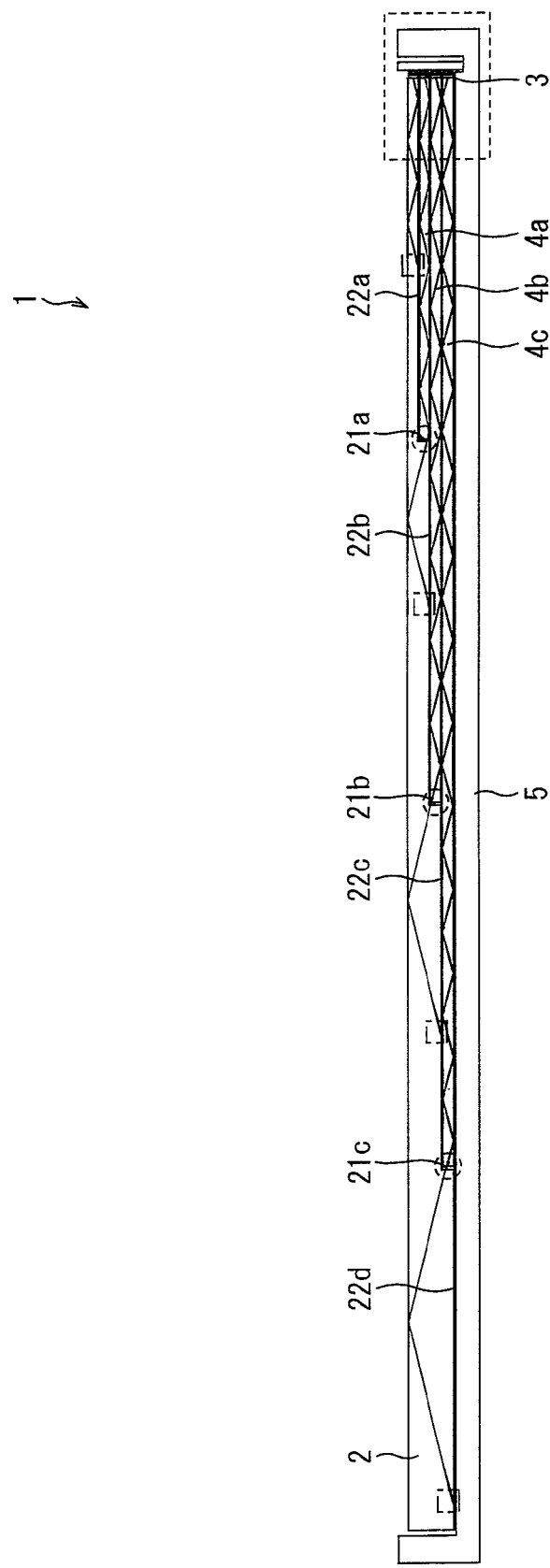
FIG. 7 is a cross-sectional view illustrating a light path in the backlight module illustrated in FIG. 1.
Figure 8:
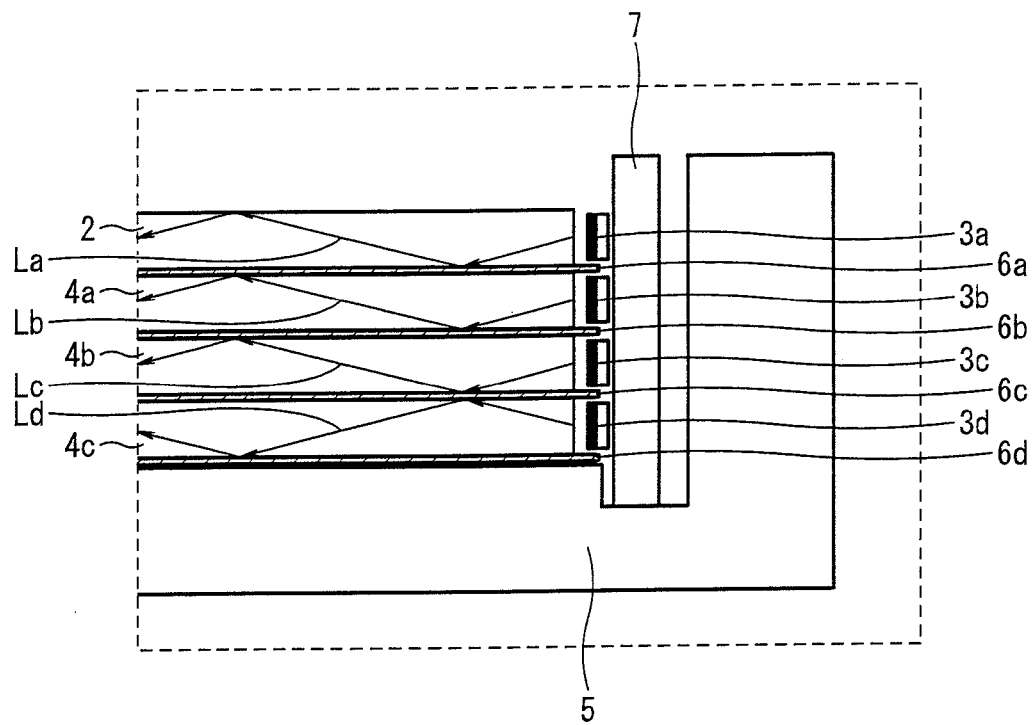
FIG. 8 is a partial magnified view illustrating a rectangular area outlined by a dashed line in the backlight module illustrated in FIG. 7.

As illustrated in FIG. 7, the light emitted from the LEDs 3 enters the side surfaces of the light guiding plate 2 and the ends of the light guides 4a through 4c, respectively. Specifically, as illustrated in FIG. 8, light La emitted from the LED 3a enters the side surface of the light guiding plate 2; light Lb emitted from the LED 3b enters the end of the light guide 4a; light Lc emitted from the LED 3c enters the end of the light guide 4b; light Ld emitted from the LED 3d enters the end of the light guide 4c.

Figure 9:
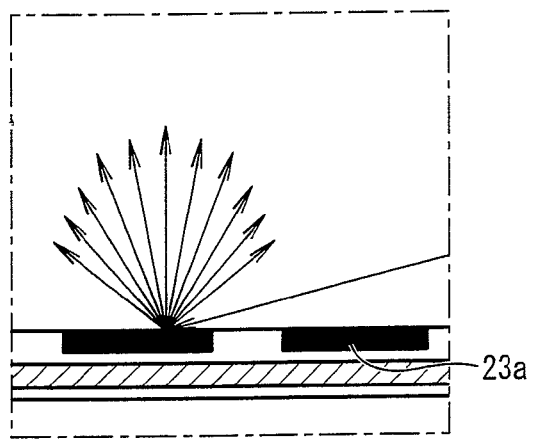
FIG. 9 is a partial magnified view illustrating a rectangular area outlined by a dashed-dotted line in the backlight module illustrated in FIG. 7.

As illustrated in FIG. 9, the light La that entered the side surface of the light guiding plate 2 is reflected and/or scattered at the bottom surface 22a of the light guiding plate 2 which bottom surface 22a has been subjected to the light reflective process. As a result, the light La is outputted from an upper surface of the light guiding plate 2, which upper surface is on the opposite side of the bottom surface 22a.

Figure 10:
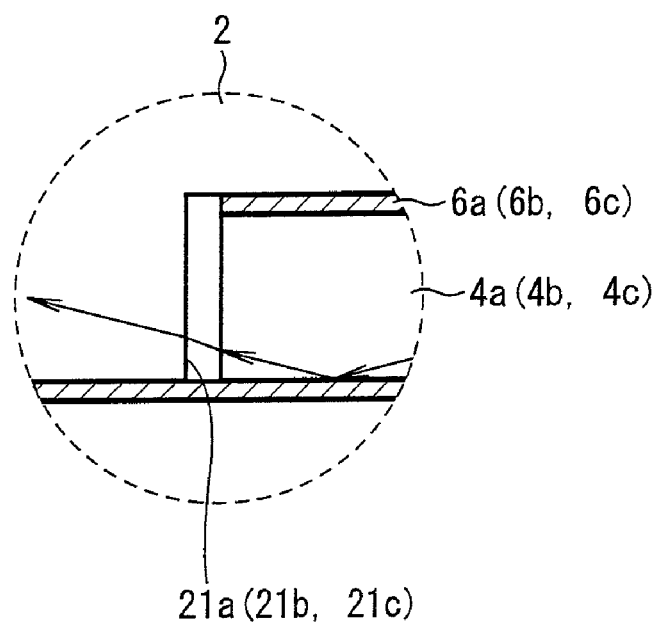
FIG. 10 is a partial magnified view illustrating a circled area outlined by a dashed line in the backlight module illustrated in FIG. 7.

On the other hand, beams of the light Lb, Lc, and Ld are respectively propagated inside the light guides 4a, 4b, and 4c by the reflecting sheet 6a, 6b, 6c, and 6d, like light propagation inside an optical fiber. Then, the light Lb, Lc, and Ld thus propagated enter the steps 21a, 21b, and 21c from the other ends of the light guides 4a, 4b, and 4c, respectively, as illustrated in FIG. 10.

Same as the light La, as illustrated in FIG. 9, beams of the light Lb, Lc, and Ld that entered the steps 21a, 21b, and 21c are reflected and/or scattered at the bottom surfaces 22b, 22c, and 22d of the light guiding plate 2, respectively. The bottom surfaces 22b, 22c, and 22d are subjected to a light reflective process. As a result, the light Lb is outputted from a region corresponding to the upper surface on the opposite side of the bottom surface 22b; the light Lc is outputted from a region corresponding to the upper surface on the opposite side of the bottom surface 22c; and the light Ld is outputted from a region corresponding to the upper surface on the opposite side of the bottom surface 22d.

The backlight module 1 is arranged so that the brightness of each beam of the light La, Lb, Lc, and Ld can be controlled by adjusting a current flowing each of the LEDs 3a, 3b, 3c, and 3d. This allows light control to be carried out with respect to four regions, i.e., (i) a region corresponding to the upper surface on the opposite side of the bottom surface 22a, (ii) a region corresponding to the upper surface on the opposite side of the bottom surface 22b, (iii) a region corresponding to the upper surface on the opposite side of the bottom surface 22c, and (iv) a region corresponding to the upper surface on the opposite side of the bottom surface 22d.

Figure 11:
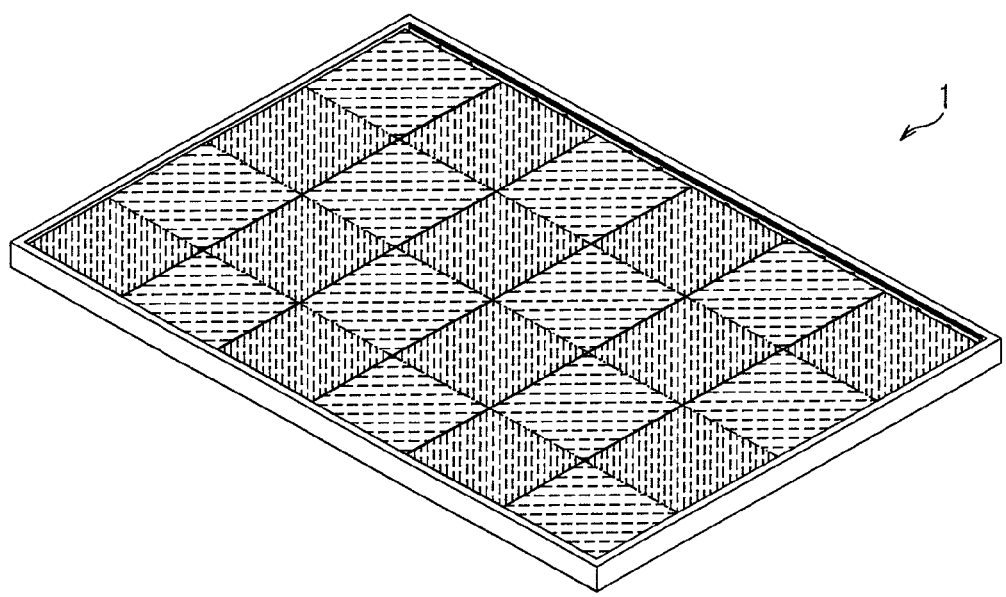
FIG. 11 is a perspective view illustrating a regional light control being conducted in the backlight module illustrated in FIG. 2.

Further, as illustrated in FIG. 2 and FIG. 3, the light guiding plate 2 is divided into a plurality of light guiding blocks 20 (divided into 6 blocks in FIG. 2) in a direction which is perpendicular to a direction from the side surface where the LEDs 3 are provided to the other side surface which faces the side surface. In addition, the light guides 4a, 4b, and 4c are also divided into 6 blocks so as to have the same widths as the light guiding blocks 20, respectively. This allows prevention of the light from being mixed between the light guides which correspond to different light guiding blocks, respectively. Further, the backlight module 1 is capable of controlling brightness of each of the LEDs 3 which are provided on one sides of the light guiding blocks 20, respectively. This allows regional light control to be carried out with respect to each of the six light guiding blocks 20. As a result, it is possible to carry out 24-region (4 regions per block×6 blocks=24) light control, as illustrated in FIG. 11.

As described above, according to the backlight module 1, it is possible to put the light on or off a target regional surface by turning on or off a corresponding LED 3. Moreover, it is possible to carry out a local dimming control in which contrast of the regions in the backlight module 1 are adjusted in sync with contrast of display image areas in a liquid crystal display apparatus, respectively. As a result, it is possible to provide a thin liquid crystal display apparatus with high contrast and low power consumption.

Further, in the backlight module 1, a distance between the step 21a and the side surface of the light guiding plate 2 where the LED 3 is provided, a distance between the step 21a and the step 21b, a distance between the step 21b and the step 21c, and a distance between the step 21c and the other side surface of the light guiding plate 2 where no LED is provided, are all the same. Moreover, the distance is equal to respective of the widths of the light guiding blocks 20. Since a width in the transverse direction of a region divided by the light guiding blocks 20 is thus equal to a width in the longitudinal direction of a region divided by the steps, it is possible to make a light-controllable unit region become a square as illustrated in FIG. 11.

Note that there arises a case where some leakage of light may occur between adjacent light guiding plates, although such leakage does not affect a normal use. In view of the circumstances, a reflecting sheet can be provided between adjacent light guiding blocks 20 so that higher contrast is achieved.

The LED 3a is provided close to the side surface of the light guiding plate 2, whereas beams of the light emitted from the LEDs 3b, 3c, and 3d enter the steps 21a, 21b, and 21c, via the light guides 4a, 4b, and 4c, respectively. A distance between LED 3b and the step 21a, a distance LED 3c and the step 21b, a distance between LED 3d and the step 21c are getting longer in this order. Accordingly, in order to uniform emission brightness over an entire display screen, brightness of the light La, Lb, Lc, and Ld respectively emitted from the LED 3a, 3b, 3c, and 3d, are controlled so that La<Lb<Lc<Ld is satisfied.

Further, the light guiding plate 2 is getting thicker stepwisely from the side surface where the LEDs 3 are provided toward the other side surface which faces the side surface. Specifically, the thickness of the light guiding plate 2 changes depending on regions respectively corresponding to the bottom surfaces 22a, 22b, 22c, and 22d. Further, in a case where (i) the distance between the side surface of the light guiding plate 2 and the step which is the closest to the side surface and (ii) the distance between adjacent steps are too short, for example, in FIG. 7 and FIG. 8, there is a possibility that the light La from the LED 3a may exceed a region corresponding to the bottom surface 22a and enters another region corresponding to the bottom surface 22b. This makes it difficult to control brightness in the vicinity of boundary between respective adjacent regions. Therefore, it is necessary to properly set ratios between the thicknesses in the regions of the light guiding plate 2 and the distances between the side surfaces of the light guiding plate 2 and the ends of the regions, respectively.

Figure 12:
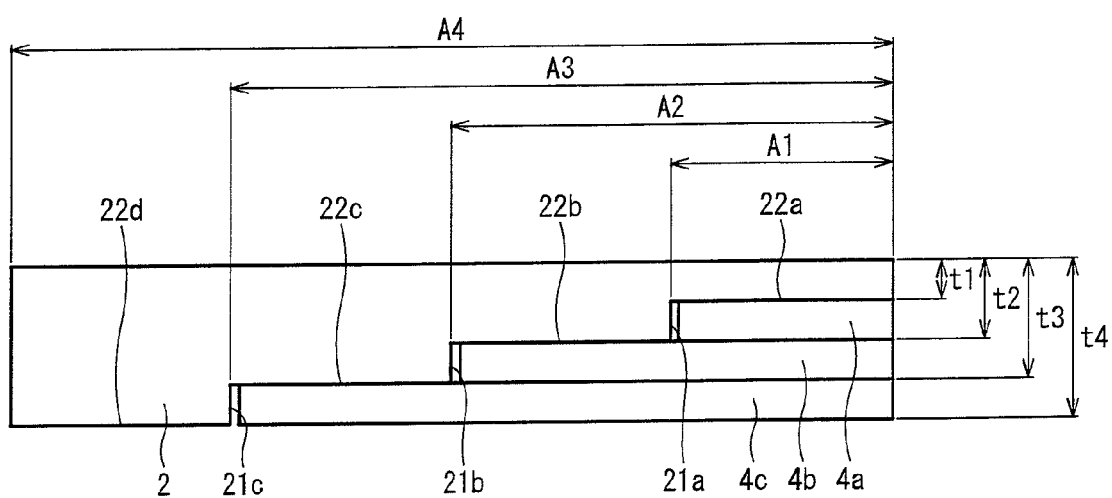
FIG. 12 is a cross-sectional view illustrating lengths and widths of a light guiding plate and light guides in the backlight module illustrated in FIG. 1.

Specifically, as illustrated in FIG. 12, it is supposed that (i) the distances between (a) the side surfaces of the light guiding plate 2 and (b) the steps 21a, 21b, 21c, and the other side surface of the light guiding plate 2 are A1, A2, A3, and A4, respectively; and (ii) the distances between the upper surface of the light guiding plate 2 and the bottom surfaces 22a, 22b, 22c, and 22d are t1, t2, t3, and t4, respectively. The ratios t1/A1, t2/A2, t3/A3, and t4/A4 should be set to 1/20 or less. It is also possible to adjust the brightness in accordance with light and shade made, during the light reflective process, on the bottom surfaces 22a, 22b, 22c, and 22d.

Figure 13:
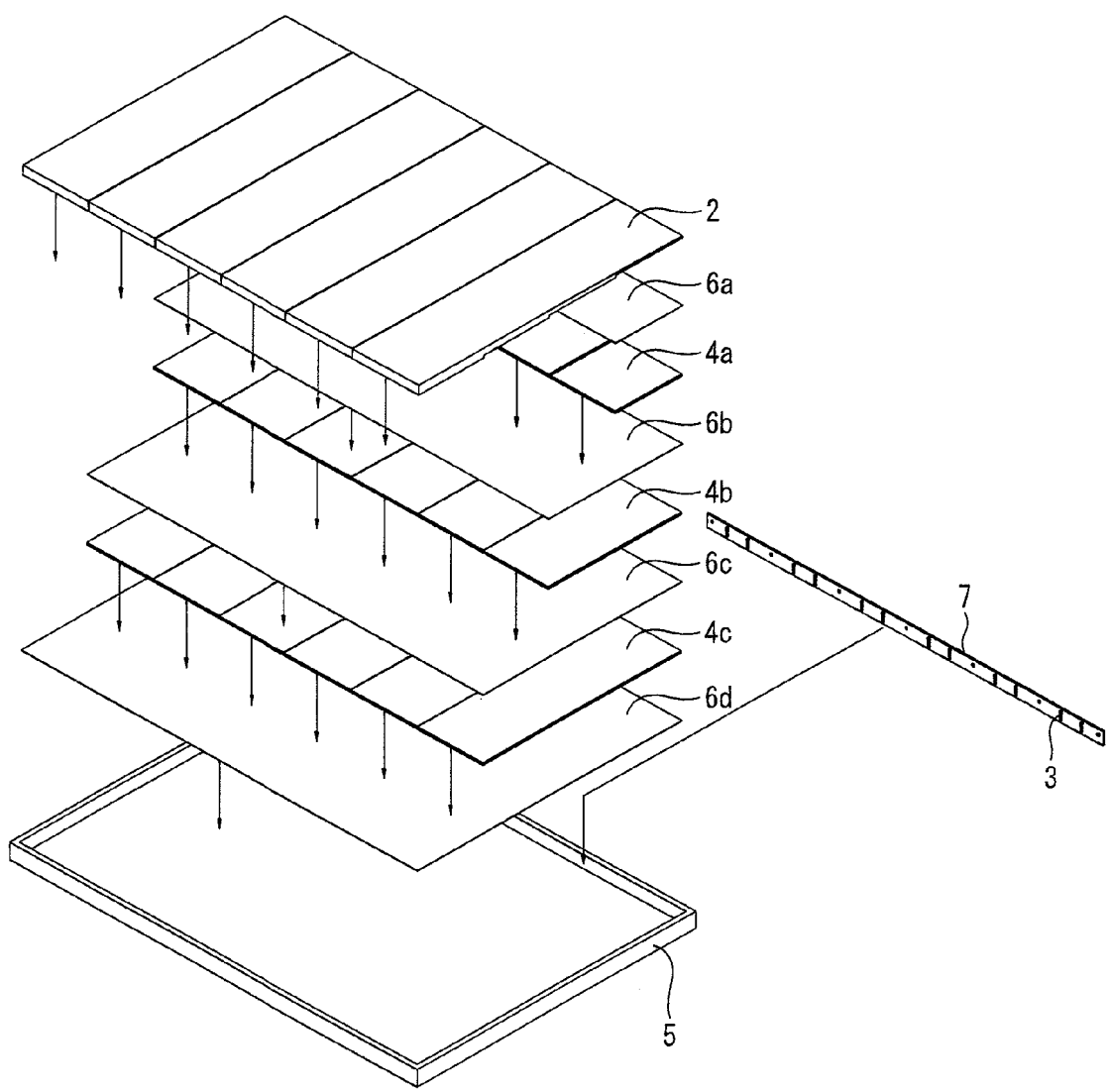
FIG. 13 is an exploded perspective view illustrating the backlight module illustrated in FIG. 2.

FIG. 13 is an exploded perspective view of the backlight module 1. In the backlight module 1, the reflecting sheet 6d, the light guide 4c, the reflecting sheet 6c, the light guide 4b, the reflecting sheet 6b, the light guide 4a, the reflecting sheet 6a, and the light guiding plate 2 are stacked inside the housing 5 in this order from the bottom to the top, and the LED substrate 7 including the LED 3 is provided inside the housing 5. Since the backlight module 1 is an edge-light type backlight, the LED substrate 7 is arranged to be long and thin. This allows a layout area of the LED 3 to become smaller.

Further, a heat releasing silicone sheet or the like is provided on a back surface of the LED substrate 7 so as to release heat, which is generated by the LEDs 3, to a metal chassis or the like of the housing 5. Since the LED substrate 7 has a small area as described above, a small-sized heat releasing silicone sheet or the like is required, thereby allowing a further cost reduction.

As compared to a direct backlight including LEDs serving as a light source, the backlight module 1 can reduce an area for an LED substrate, thereby resulting in that a significant reduction in thickness can be achieved. Further, the backlight module 1 only requires a single LED substrate 7. As compared to a conventional tandem type surface light source device, it is possible to reduce an area for the LED substrate, and to simplify an arrangement for attaching a light guiding plate, a substrate, and the like. Further, it is not necessary to connect LED substrates with each other, thereby allowing a reduction in manufacturing cost. Thus, it is possible to manufacture the backlight module 1 without a complicated manufacturing step.

Figure 14:
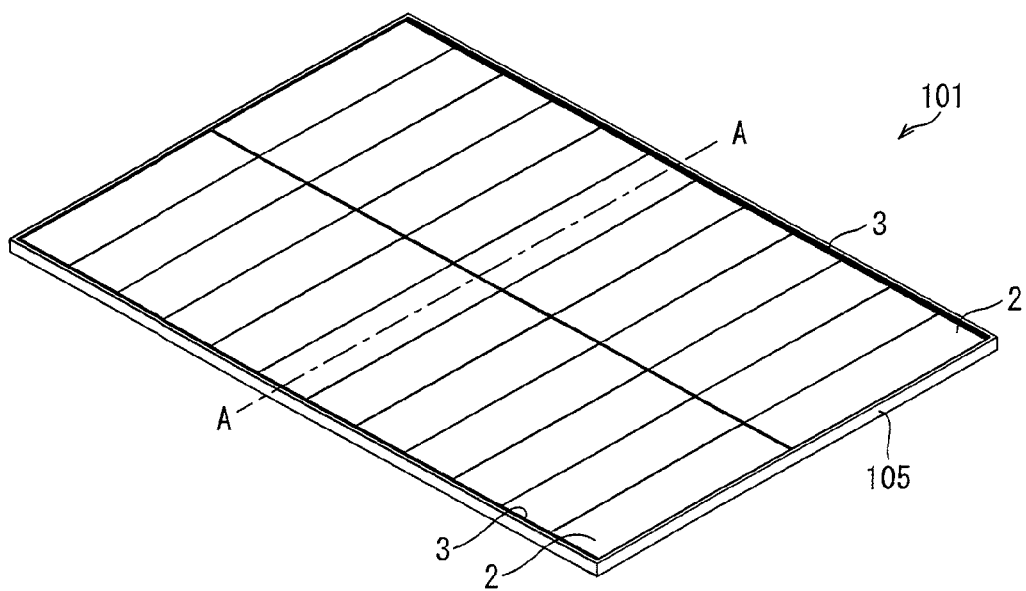
FIG. 14 is a perspective view illustrating a backlight module in accordance with a modification example of an embodiment in the present invention.
Figure 15:
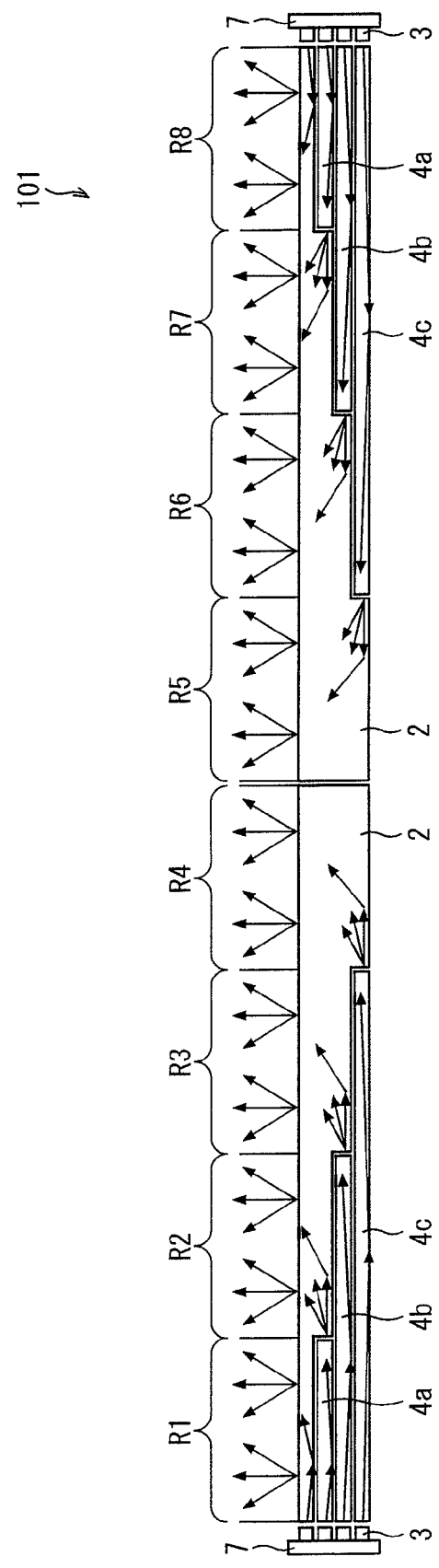
FIG. 15 is a cross-sectional view illustrating the backlight module illustrated in FIG. 14, viewed along the line A-A.
Figure 16:
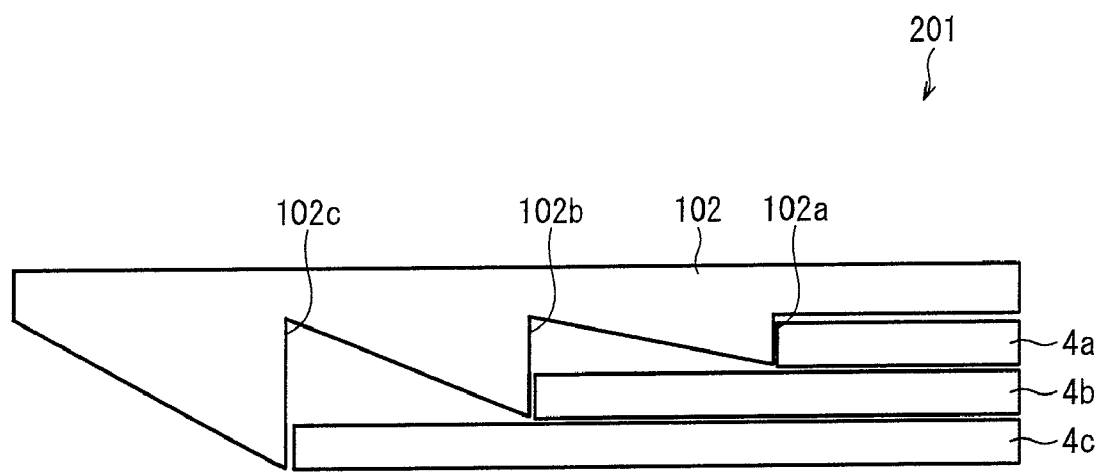
FIG. 16 is a cross-sectional view illustrating a backlight module in accordance with another modification example of an embodiment in the present invention.

The following description deals with modified examples of a backlight module with reference to FIG. 14 through FIG. 16.

FIG. 14 is a perspective view illustrating a backlight module 101 in accordance with a modified example of the present embodiment. The backlight module 101 includes two light guiding plates 2, each of which is divided into 12 blocks. The two light guiding plates 2 are combined with each other, and are held and housed inside a housing 105. Further, in the backlight module 1 illustrated in FIG. 2, the LEDs 3 serving as a light source are provided only one side of the housing 5 in a longitudinal direction, whereas, in the backlight module 101, the LEDs 3 are provided both sides of the case 105 in a longitudinal direction. This allows realization of a backlight module that addresses a liquid crystal display apparatus which is larger in size.

FIG. 15 is a cross-sectional view illustrating an overview structure of the backlight module 101, viewed along the line A-A. In the backlight module 101, the two light guiding plates 2 are combined so as to be axisymmetric so that the side surfaces of the light guiding plates 2 where the LEDs 3 are not provided, face each other. An arrangement on the right side of FIG. 15 is substantially equivalent to a structure illustrated in FIG. 1. This allows light control to be carried out with respect to 8 regions, i.e., a region R1 through a region R8, of the two light guiding plates 2. As illustrated in FIG. 14, the backlight module 101, as a whole, is capable of carrying out 96-region (8 regions×12 blocks=96) light control.

The backlight module 101 is arranged in combination with two light guiding plates 2. However, the modified example does not limited to this. Alternatively, three or more light guiding plates can be combined with each other. This allows realization of a larger sized backlight module.

FIG. 16 is a cross-sectional view illustrating a schematic arrangement of a backlight module 201 in accordance with another modified example of the present embodiment. Instead of using the light guiding plate 2 of the backlight module 1 illustrated in FIG. 1, the backlight module 201 includes a light guiding plate 102. In the light guiding plate 2, the upper surface and the bottom surface are in parallel to each other. On the other hand, the light guiding plate 102 is divided into regions by steps 102a, 102b, and 102c. Each of the regions has a sloped bottom surface so that each region has a tapered shape, except a region on a side where the LED 3 is provided. Accordingly, the light guiding plate 102 has an uneven thickness even within the same region. This causes the light guiding plate 102 to have a reduced volume, thereby allowing an improvement in weight saving. Normally, a light guiding plate is made by carrying out an injection molding with use of metal mold that has been prepared. Therefore, manufacturing cost is irrespective of whether the light guiding plate is formed to have a flat surface or a sloped surface.

Figure 17:
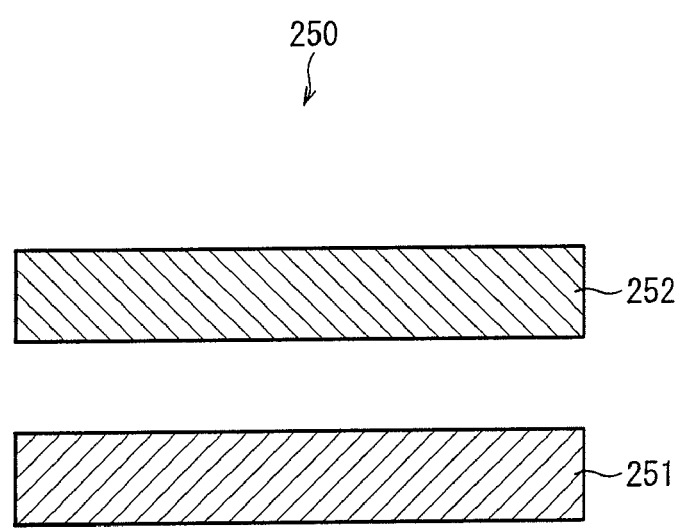
FIG. 17 is a schematic view illustrating a display apparatus in accordance with an embodiment of the present invention.
Figure 18:
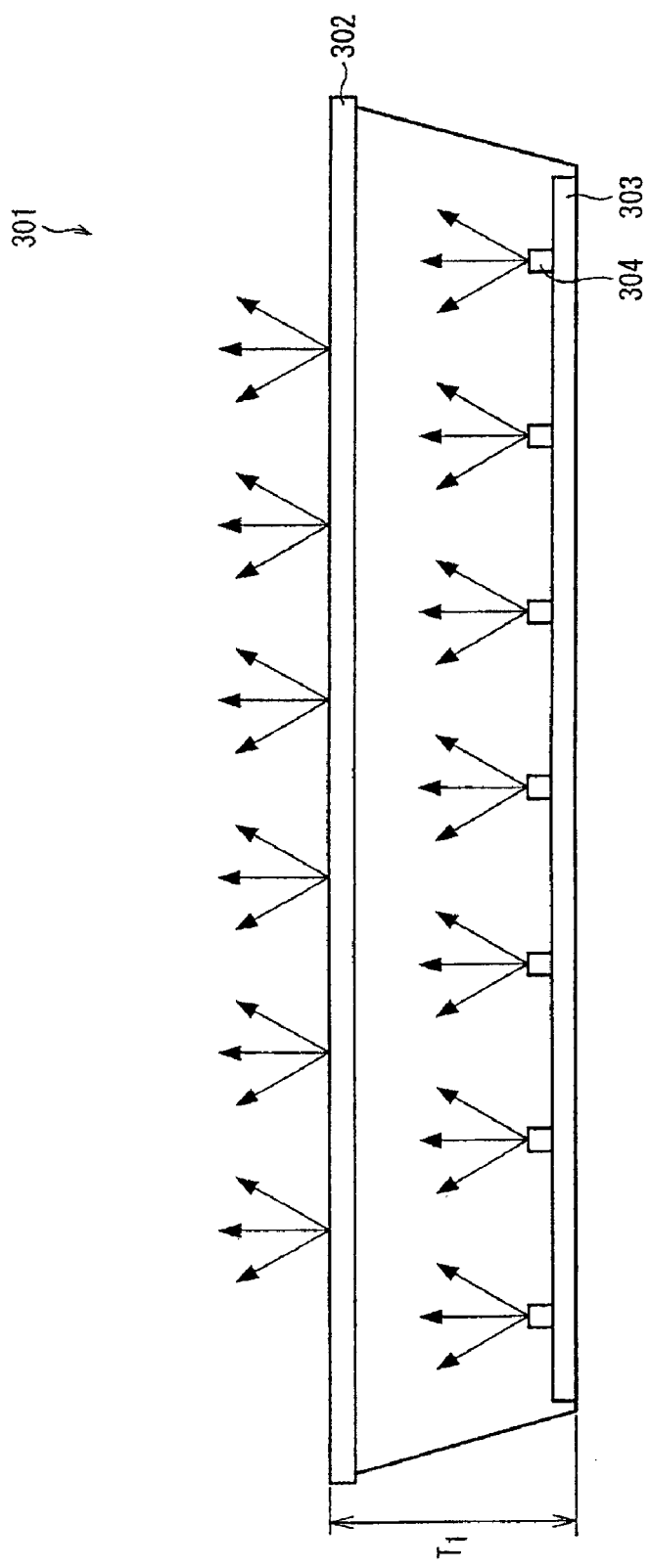
FIG. 18 is a cross-sectional view illustrating a typical direct backlight.
Figure 19:
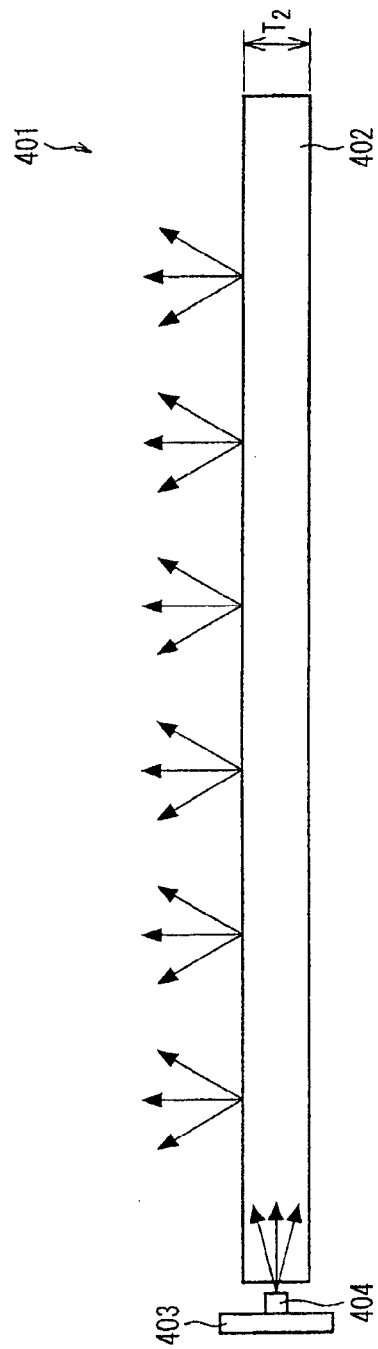
FIG. 19 is a cross-sectional view illustrating a typical edge light type backlight.
Figure 21:
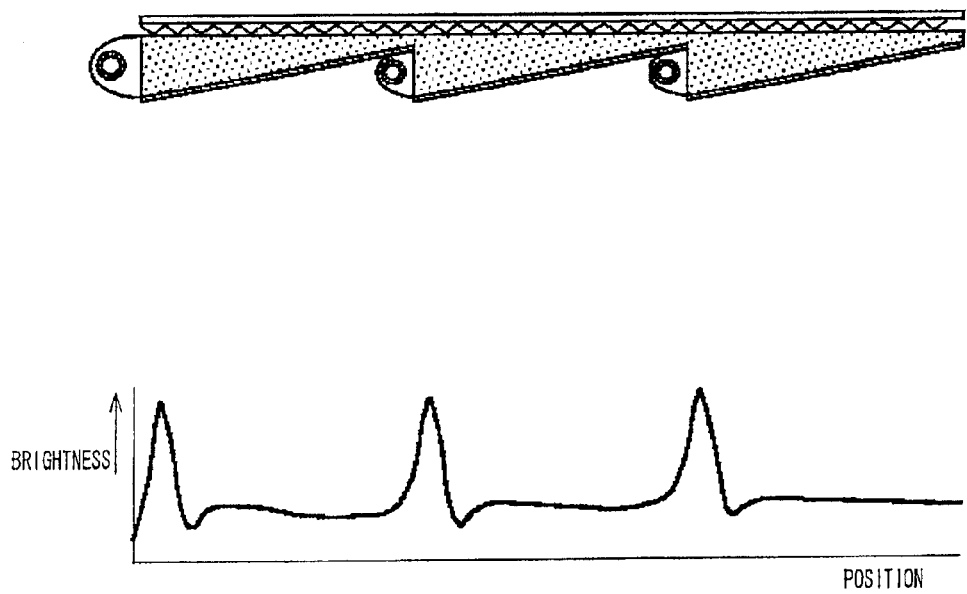
FIG. 21 is a drawing illustrating a conventional tandem type surface light source device and a graph showing a relation between brightness and a position in the conventional tandem type surface light source device.
Figure 23:
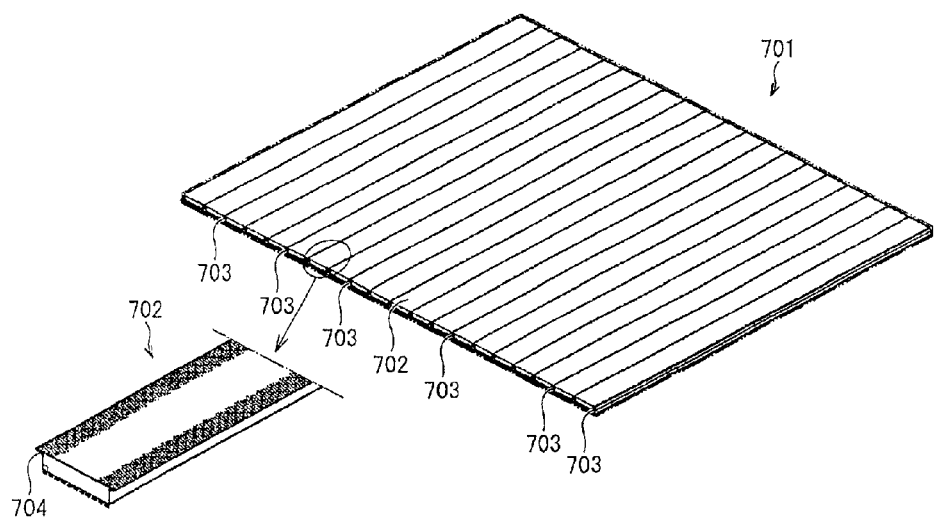
FIG. 23(a) and FIG. 23(b) are drawings illustrating further another conventional illuminating device.
Figure 23:
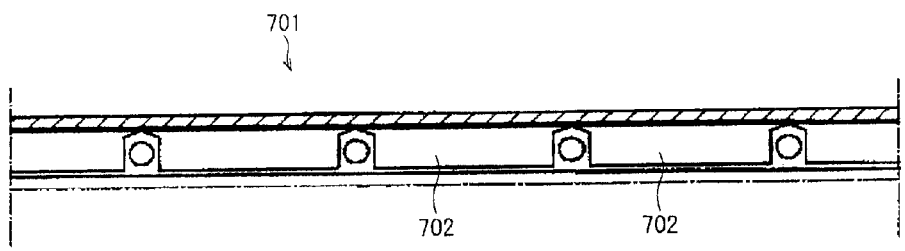
Figure 24:
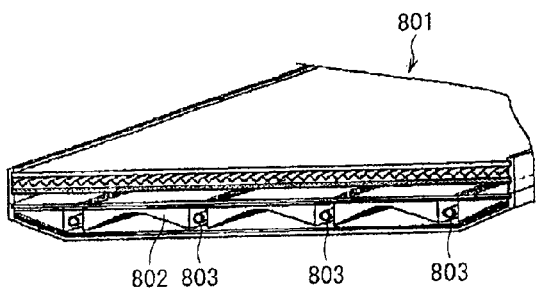
FIG. 24(a) through FIG. 24(c) are drawings illustrating still further another conventional illuminating device.
Figure 24:
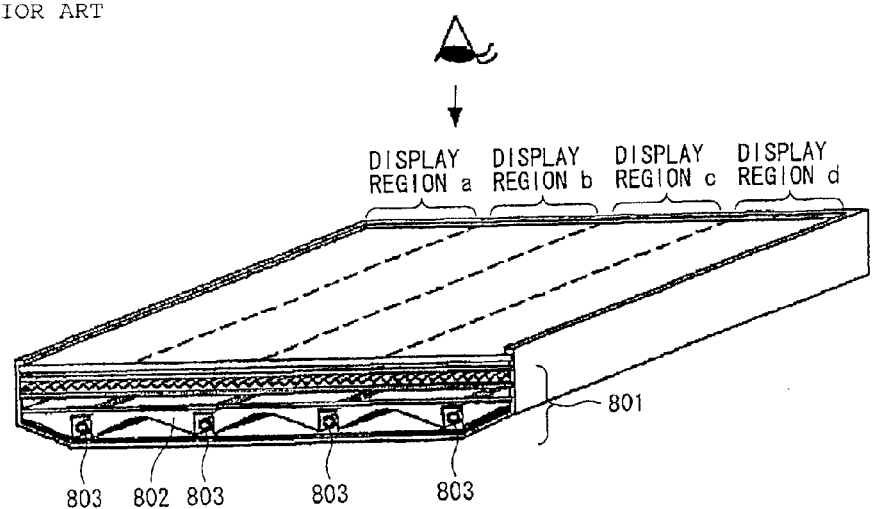
Figure 24:
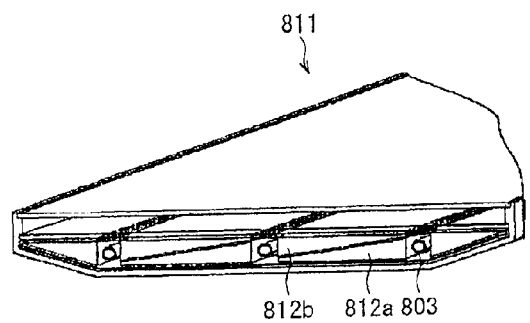
Figure 25:
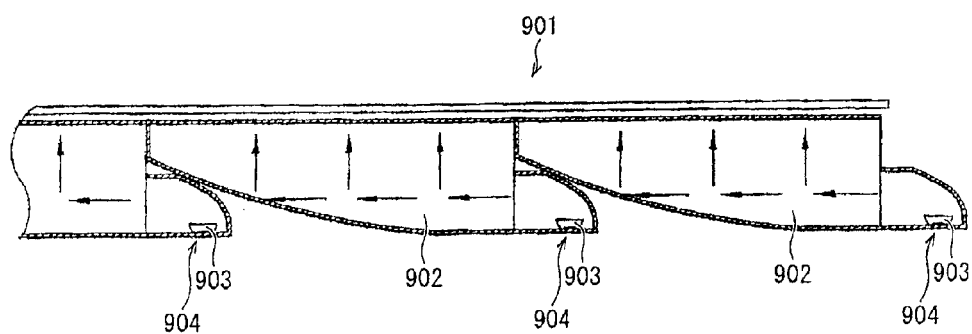
FIG. 25(a) and FIG. 25(b) are drawings illustrating yet another conventional backlight.
Figure 25:
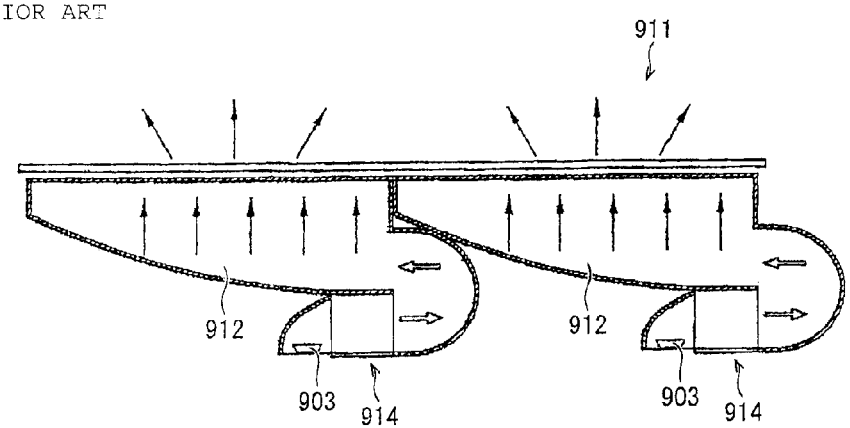

FIG. 17 is a schematic view illustrating a display apparatus 250 in accordance with the present embodiment. The display apparatus 250 includes a backlight module 251 and a liquid crystal panel 252. It is possible to use, as the backlight module 251, the backlight module 1, 101, or 201 of the present embodiment.

In the present embodiment, an LED is used as a light source. Alternatively, a fluorescent lamp such as a cold cathode fluorescent lamp can be used. In this case, it is also possible to carry out a regional light control with respect to each of regions divided by a plurality of steps.

A light guiding plate and a light guide are both transparent flat plates, and can be made by the same material. However, it is necessary that surfaces for receiving light and outputting light be flat. Therefore, a light guiding plate should have flat surfaces, and a light guide should at least have flat side surfaces. A light guide can have a wider tolerance than a light guiding plate because smaller concavity and convexity cause leakage of light is unacceptable but such a gentle undulating surface that does not cause leakage of light is acceptable.

Further, it is possible to realize a thin and simple-structured liquid crystal display apparatus which is capable of carrying out a regional light control, by adopting a backlight module of the present embodiment as a backlight of the liquid crystal display apparatus.

General Overview of the Embodiments

The present invention is not limited to the description of the embodiments above, but can be altered by a skilled person in the art within the scope of the claims. Specifically, an embodiment obtained by a combination of technical means which is appropriately modified within the scope of the claims is encompassed in the technical scope of the present invention.

A planar illuminating device of the present embodiment includes a light guiding plate which is a transparent flat plate; a plurality of light sources provided on one side surface of the light guiding plate, the light guiding plate outputting, from its upper surface, light coming from the plurality of light sources, the plurality of light sources being provided in a direction perpendicular to the upper surface of the light guiding plate, and the light guiding plate having a bottom surface which includes at least one step, the planar illuminating device, further including a light guide provided between said each step and a corresponding one of said plurality of light sources which faces that step, said light guide being thinner than that step. This allows realizing a thin and simple-structured planar illuminating device which is capable of carrying out the regional light control.

A backlight module in accordance with the present invention is applicable not only to a backlight of a liquid crystal display apparatus, but also to a light source of an advertising display for internal illuminating type.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A planar illuminating device comprising:
    a light guiding plate which is a transparent flat plate; and
    a plurality of light sources provided at one side surface of the light guiding plate,
    said light guiding plate outputting, from its upper surface, light coming from the plurality of light sources,
    said plurality of light sources being provided in a direction perpendicular to the upper surface of said light guiding plate, and
    said light guiding plate having a bottom surface which includes at least one step,
    said planar illuminating device, further comprising:
    a light guide provided between said each step and a corresponding one of said plurality of light sources which faces that step, said light guide being thinner than that step.

2. The planar illuminating device according to claim 1, wherein:
    a thickness of said light guiding plate is getting thicker stepwisely from said one side surface to the other side surface which faces said one side surface.

3. The planar illuminating device according to claim 1, wherein:
    the light guiding plate is divided into a plurality of light guiding blocks at equal intervals in a transverse direction, wherein a longitudinal direction is in the direction from said one side surface to the other side surface.

4. The planar illuminating device according to claim 1, wherein:
    said light guide is sandwiched between reflecting sheets which reflect visible light.

5. The planar illuminating device according to claim 3, wherein:
    (i) the bottom surface of said light guiding plate, or (ii) a bottom surface of a light guiding block is subjected to light reflective process.

6. The planar illuminating device according to claim 3, wherein:
    said light guides are provided as many as the light guiding blocks so that the light guide has a width which is equal to a width of the light guiding block, in the transverse direction.

7. The planar illuminating device according to claim 3, further comprising:
    reflecting sheets provided between the light guiding blocks, the reflecting sheets reflecting visible light.

8. The planar illuminating device according to claim 3, wherein:
    said at least one step includes a plurality of steps, and
    a distance between adjacent two of the steps and a distance between said one side surface of the light guiding plate and one of the steps which is the closest to said one side surface are equal to each other.

9. The planar illuminating device according to claim 8, wherein:
said light guiding blocks have a width in the transverse direction, which width is equal to a distance between adjacent two of the light guiding blocks.

10. The planar illuminating device according to claim 1, wherein:
a plurality of said light guiding plates are provided.

11. The planar illuminating device according to claim 10, wherein:
two light guiding plates are provided such that side surfaces where said plurality of light sources are not provided, face each other.

12. A display apparatus, in which a planar illuminating device is adopted as a backlight, said planar illuminating device, comprising:
a light guiding plate which is a transparent flat plate; and
a plurality of light sources provided at one side surface of the light guiding plate,
said light guiding plate outputting, from its upper surface, light coming from light sources,
said plurality of light sources being provided in a direction perpendicular to the upper surface of said light guiding plate,
said light guiding plate having a bottom surface which includes at least one step,
said planar illuminating device, further comprising:
a light guide provided between said each step and a corresponding one of said plurality of light sources which faces that step, said light guide being thinner than that step.

* * * * *